March 25, 1924.
O. R. MANVILLE
TOOL GRINDER
Filed March 6, 1922   2 Sheets-Sheet 2
1,487,962
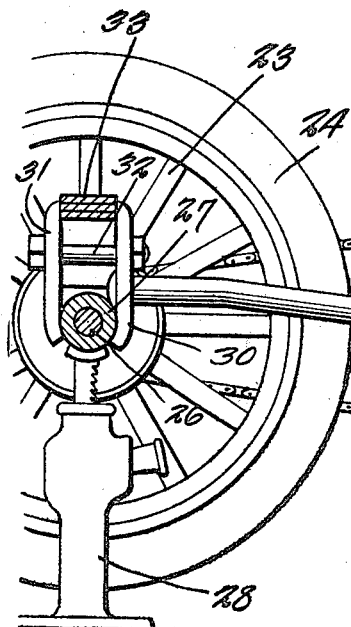
Fig. 3.
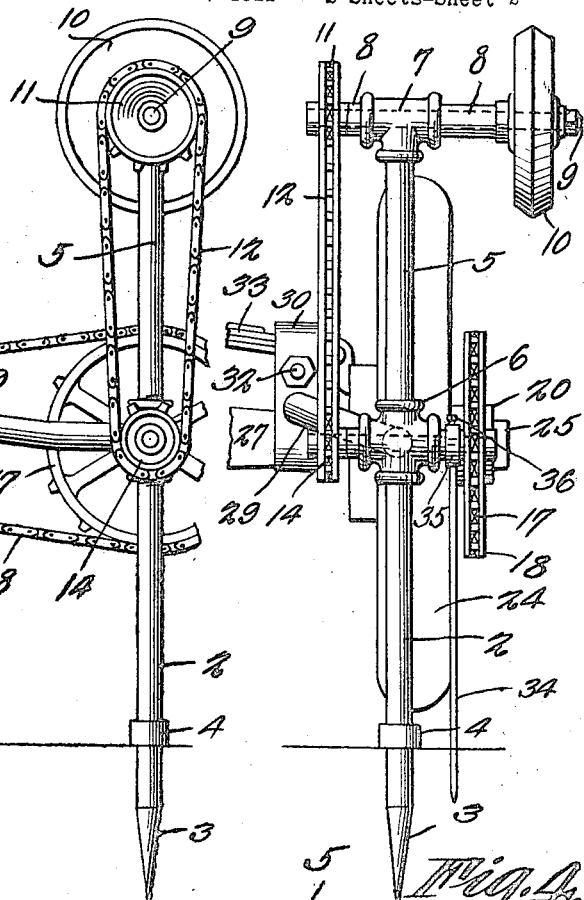
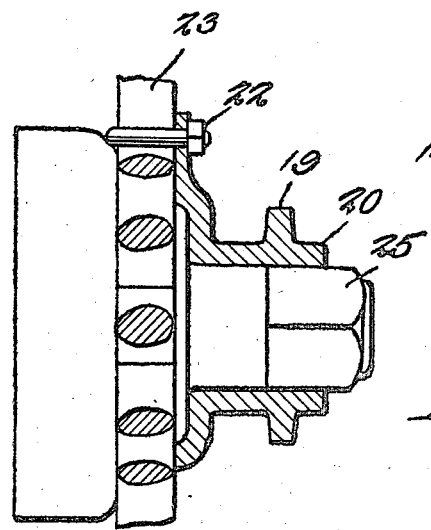
Fig. 5.
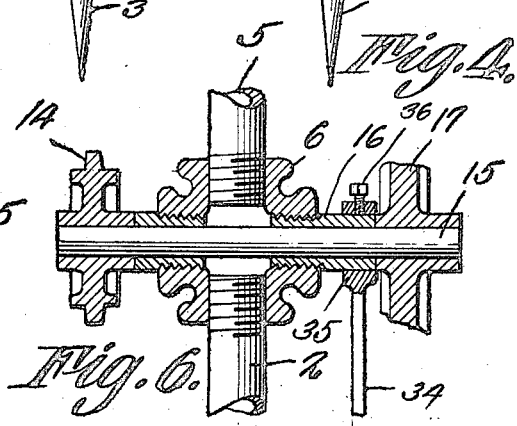
Fig. 4.
Fig. 6.
Inventor
O. R. Manville
By
Attorneys Patented Mar. 25, 1924.

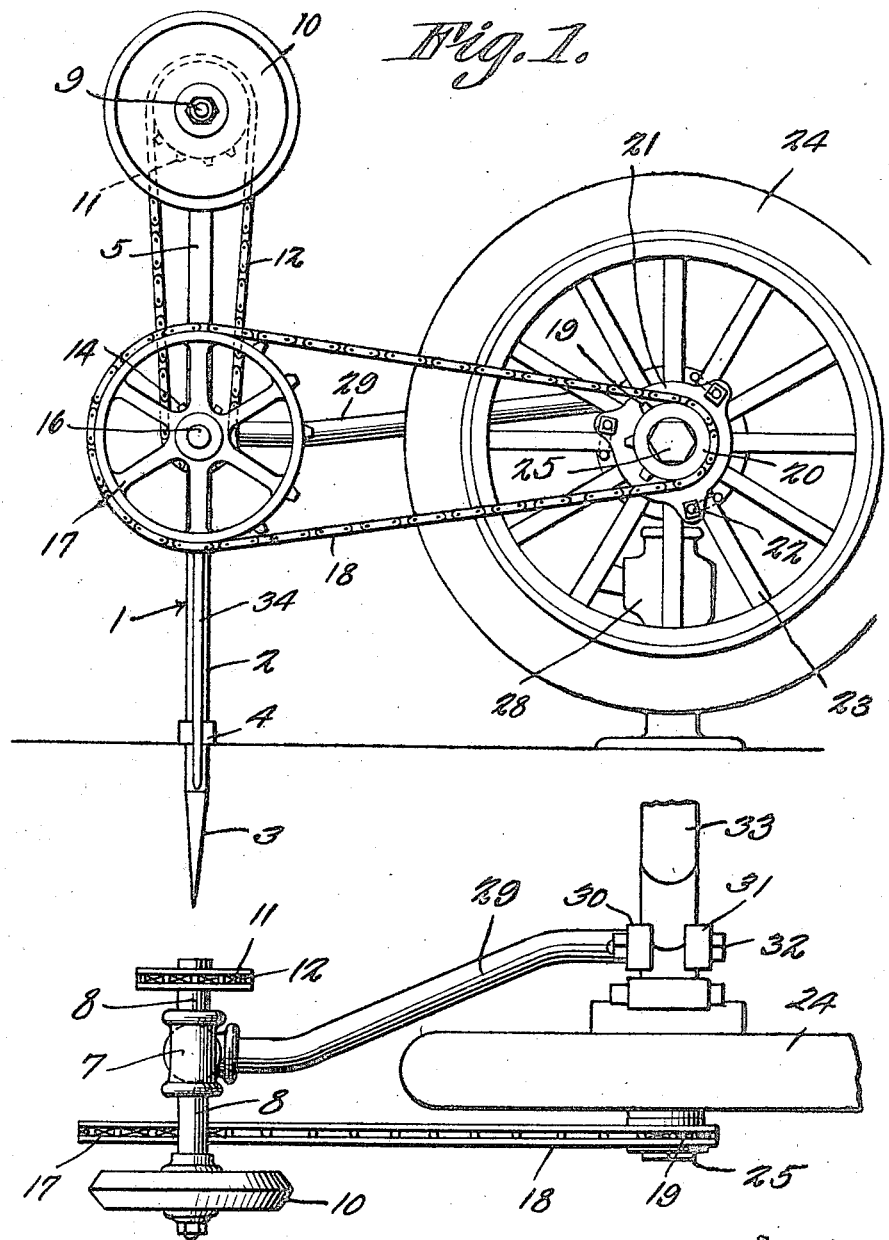

1,487,962

UNITED STATES PATENT OFFICE.

OSCAR R. MANVILLE, OF BRECKENRIDGE, MISSOURI.

TOOL GRINDER.

Application filed March 6, 1922. Serial No. 541,412.

*To all whom it may concern:*

Be it known that I, OSCAR R. MANVILLE, a citizen of the United States, residing at Breckenridge, in the county of Caldwell and State of Missouri, have invented a new and useful Tool Grinder, of which the following is a specification.

This invention aims to provide a simple means whereby the wheel of an automobile may be used for driving a grind stone, and for other purposes.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a top plan thereof; Figure 3 is an elevation wherein appears the opposite side of the structure from that delineated in Figure 1; Figure 4 is an end elevation; Figure 5 is a sectional detail illustrating the means whereby connection is made with the wheel of the automobile; and Figure 6 is a sectional detail illustrating a portion of the standard or support, and parts carried thereby.

In carrying out the invention, there is provided a standard or support, denoted generally by the numeral 1. The standard 1 comprises a lower member 2 having a point 3 adapted to be inserted into the ground, the lower member having a collar 4 which limits the introduction of the point 3 into the ground. The standard 1 includes an upper member 5. The members 2 and 5 of the standard 1 are threaded into the vertical arms of a cross 6, as shown in Figure 4. A T 7 is mounted on the upper end of the member 5 of the standard 1. The lateral arms of the T 7 carry tubular bearings 8 wherein a shaft 9 is journaled. A grinding wheel 10 is secured to one end of the shaft 9 although the grinding wheel may be replaced by any other suitable object which is to be driven. A sprocket wheel 11 is secured to that end of the shaft 9 which is remote from the grinding wheel 10. A sprocket chain 12 is engaged around the sprocket chain 11, and cooperates with a sprocket wheel 14 secured to a shaft 15 journaled in bearings 16 threaded into the horizontal arms of the cross 6.

That end of the shaft 15 which is remote from the sprocket wheel 14 carries a sprocket wheel 17 cooperating with a horizontally disposed sprocket chain 18 engaged with a sprocket wheel 19 on a tubular socket 20 carried by a base plate 21, the base plate 21 being attached by securing elements 22, such as U-bolts, to the spokes 23 of an automobile wheel 24, the hub 25 of the automobile wheel being received in the socket 20. The rear axle of the automobile is denoted by the numeral 26, the axle casing by the numeral 27, and the vehicle spring by the numeral 33. In operation, one or more jacks 28 serve to elevate the wheel 24, so that the same may rotate.

A laterally inclined brace 29 is connected at one end with the cross 6, the other end of the brace being connected to one member 30 of a clamp, the other member of the clamp being denoted by the numeral 31. The clamp members 30 and 31 are adapted to grip the axle casing 27, and the spring 33 of the vehicle, as shown in Figure 3, the clamp members being connected by a tightening device 32, which may be a bolt.

In practical operation, when rotation is imparted to the wheel 24 of the automobile, through the instrumentality of the automobile engine, the automobile being jacked up, as shown in Figure 3, motion will be transmitted to the sprocket wheel 19, from the wheel 24, the sprocket wheel 19 actuating the chain 18, and rotation being transmitted to the shaft 15 by way of the sprocket chain 20 and the sprocket wheel 17. From the shaft 15, the sprocket wheel 14 and the chain 12 impart rotation to the shaft 9 and the grinding wheel 10 or its equivalent, by way of the sprocket wheel 11.

The device is so constructed that it may be made cheaply out of stock materials. The structure will be stable in operation, owing to the fact that one end of the standard 1 is threaded into the ground, the brace 29 being attached securely to the frame work of the vehicle.

A ground-engaging brace 34 may be provided, in order to steady the device, the brace including a collar 35, held by a set screw 36 on one of the bearings 16, adjacent to the wheel 17, the brace being of any desired form so as to serve as a prop.

What is claimed is:—

1. In a device of the class described, a standard comprising upper and lower parts; a connection uniting said parts; a brace projecting from the connection; a shaft journaled in the connection; a driven element on the upper part of the standard; means for connecting the driven element operatively with the shaft; means for connecting the brace with a vehicle frame; a sprocket wheel; means for connecting the sprocket wheel to a vehicle wheel; and a sprocket chain forming an operative connection between the said sprocket wheel and the shaft.

2. In a device of the class described, a substantially vertical standard provided at its lower end with a ground-entering spur, a substantially horizontal brace projecting from the intermediate portion of the standard, a clamp carried by the outer end of the brace, shafts journaled in vertically spaced relation on the standard, means for connecting the shafts operatively, and means for driving the lower one of said shafts.

3. In a device of the class described, a standard provided intermediate its ends with a bearing, a prop mounted to swing on the bearing, a shaft journaled in the bearing, means for driving the shaft, a second shaft journaled on the standard, above the first specified shaft, and means for connecting the shafts operatively.

In testimony that I claim the foregoing as my own, I have hereto affixed my signature in the presence of two witnesses.

OSCAR R. MANVILLE.

Witnesses:
G. W. SHERMAN,
E. E. DIVINID.